United States Patent [19]
Mailleux

[11] Patent Number: 5,984,371
[45] Date of Patent: Nov. 16, 1999

[54] HYDRAULIC COUPLING DEVICE

[75] Inventor: Loïc Mailleux, Rennes, France

[73] Assignee: Souete d'etude et d'Innovation Dans le Materiel Agricole, France

[21] Appl. No.: 09/068,663

[22] PCT Filed: Oct. 22, 1996

[86] PCT No.: PCT/FR96/01649

§ 371 Date: May 8, 1998

§ 102(e) Date: May 8, 1998

[87] PCT Pub. No.: WO97/17564

PCT Pub. Date: May 15, 1997

[30] Foreign Application Priority Data

Nov. 8, 1995 [FR] France .................................. 95 13440

[51] Int. Cl.$^6$ .................................................. F16L 35/00
[52] U.S. Cl. .............................. 285/26; 285/93; 285/312; 285/901
[58] Field of Search ................................. 285/24, 25, 26, 285/27, 28, 29, 311, 93, 312, 901

[56] References Cited

U.S. PATENT DOCUMENTS 5,172,998 12/1992 Hatagishi ............................ 285/312 X
5,344,194 9/1994 Hattagishi et al. .................. 285/311 X
5,507,530 4/1996 Mahaney ................................... 285/26

FOREIGN PATENT DOCUMENTS 390715 10/1990 European Pat. Off. ................. 285/26
595463 7/1959 Italy ...................................... 285/312

Primary Examiner—Dave W. Arola
Attorney, Agent, or Firm—Blakely Sokoloff Taylor & Zafman

[57] ABSTRACT

In the device, the male connection members (3) are carried by a plate (11) provided with a pair of identical downwardly-extending side prongs, each of the prongs being provided with a recess (101) having a forwardly-facing shaped edge, whereas the female members (4) are carried by an upwardly open housing (2) in which a locking shaft (5) is mounted to rotate and guided in rotation, the shaft being provided with two cam-forming portions (50), each of which is suitable for co-operating with the recessed shaped edge of a respective prong (10). Hydraulic connection, e.g. between a machine and a hydraulic source.

8 Claims, 3 Drawing Sheets

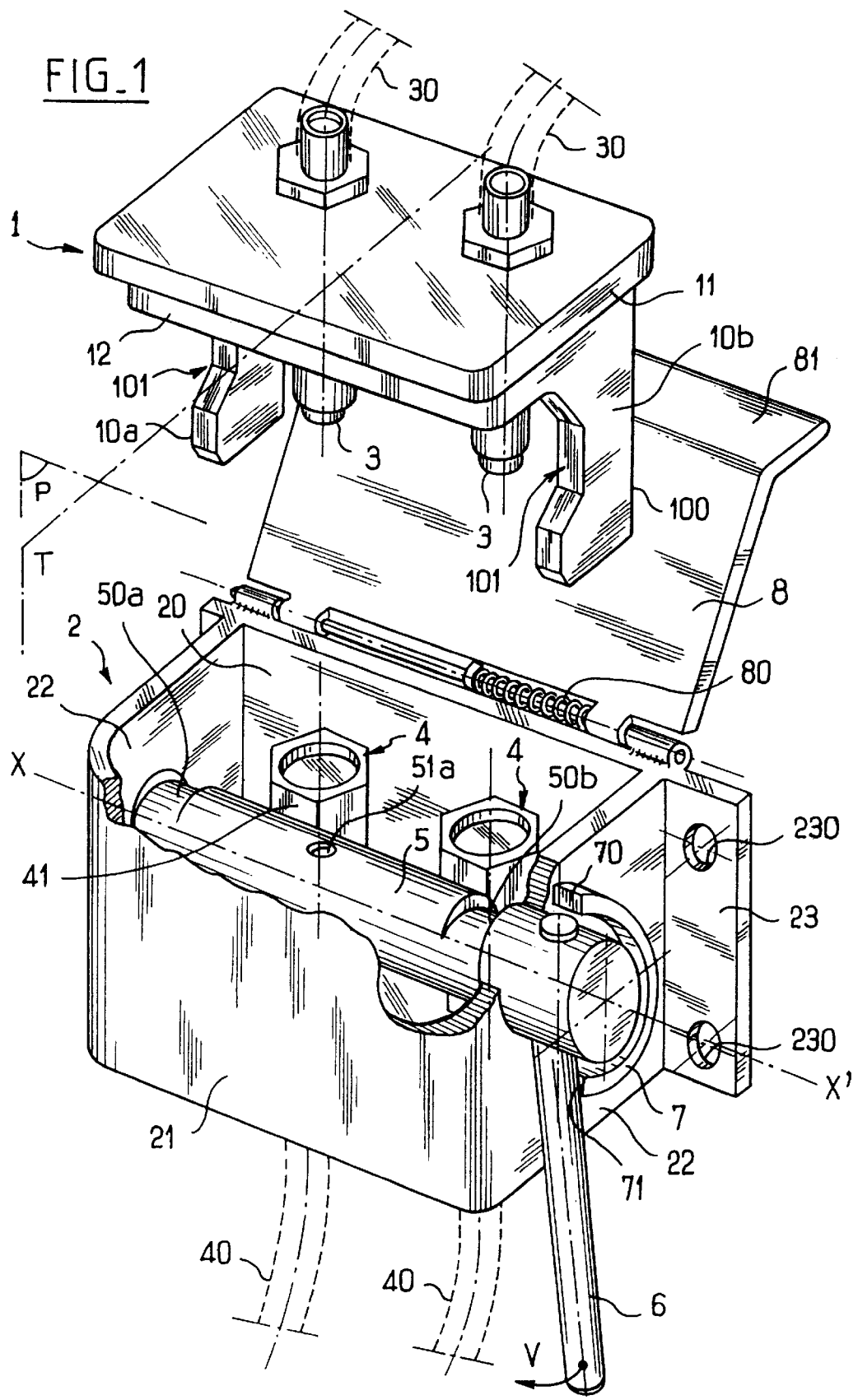
FIG_1

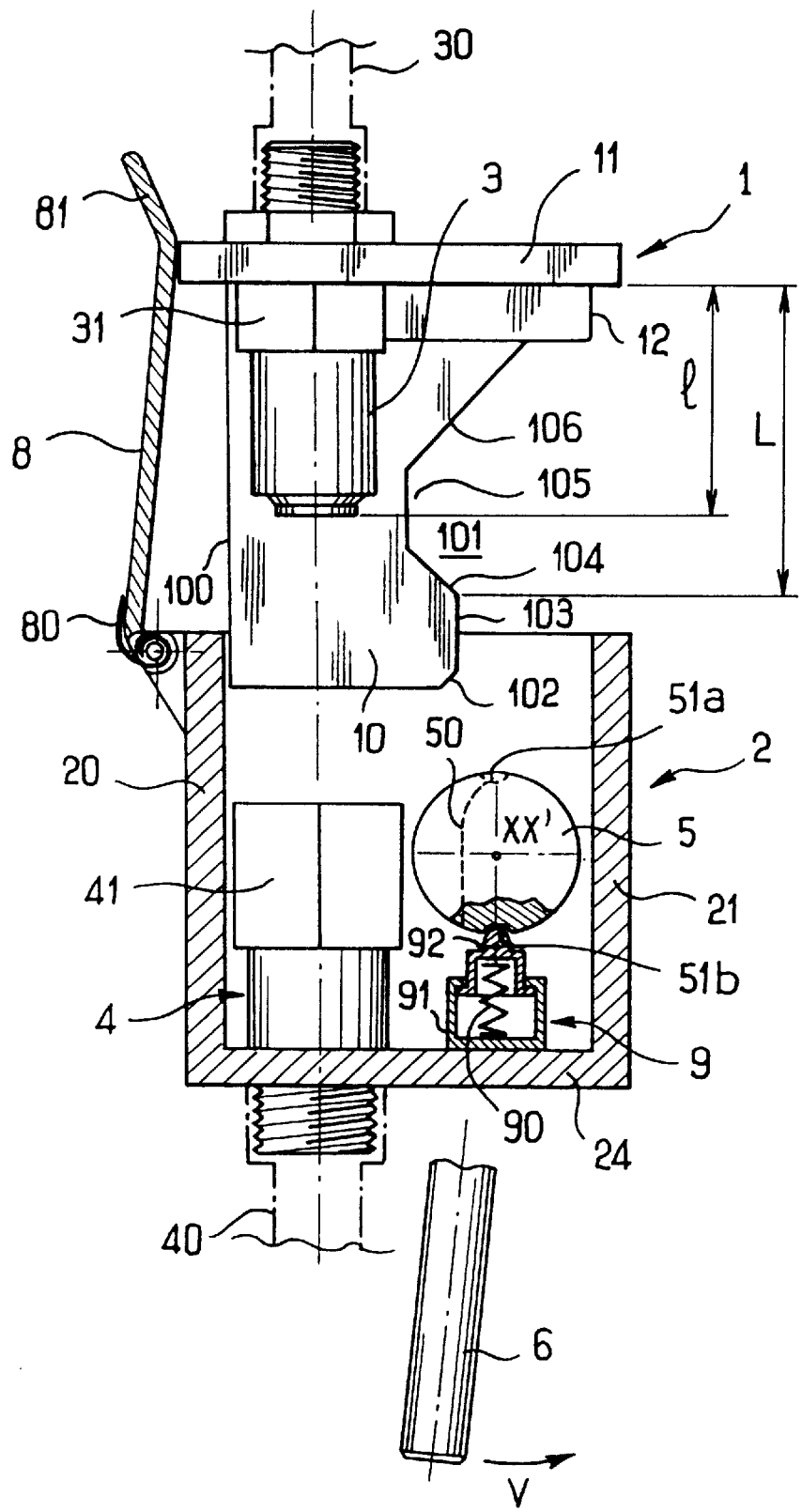
FIG_2

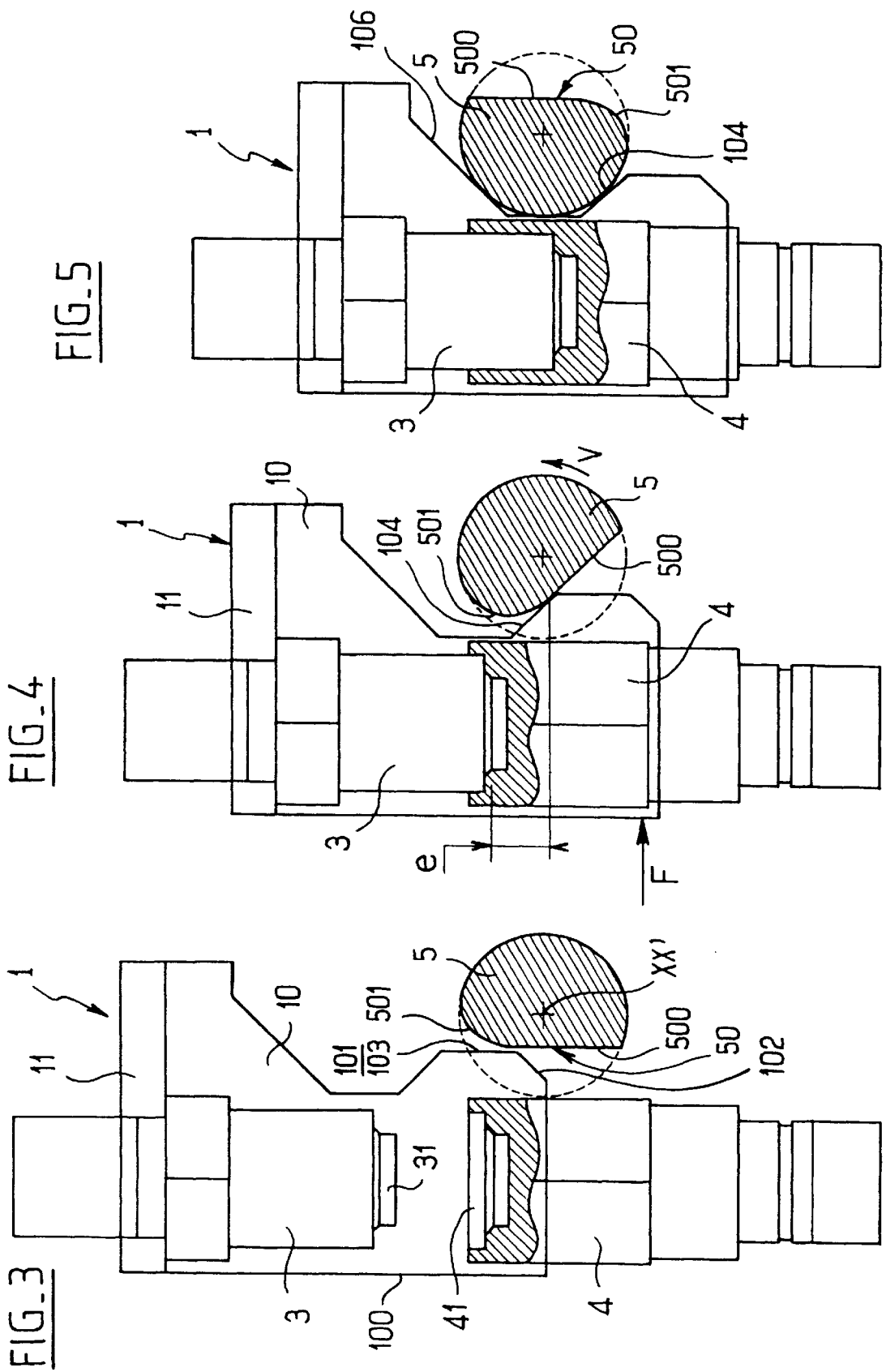

HYDRAULIC COUPLING DEVICE

The present invention relates to a hydraulic connection device for hydraulically connecting together at least one pair of complementary connection members suitable for being interfitted axially, namely a male member and a female member.

In numerous industrial fields, it is necessary to connect a machine or some other equipment to one or more hydraulic liquid distribution sources in fluid-tight manner by means of one or more distinct connections.

This applies in particular to the hydraulic link between a farm tractor and a hydraulically driven loader device designed to be removably mounted on the tractor.

Various devices have been proposed, and they are generally complex, voluminous, and costly.

An object of the invention is to provide a hydraulic connection device that is extremely compact, while being robust, simple to use, and cheap.

The device provided includes at least one pair of complementary connection members, and preferably more than one pair of complementary members suitable for being interfitted axially, namely a male member and a female member.

Said device is remarkable in that it comprises:
an upwardly open rectangular housing whose bottom carries one of said members;
a plate carrying the other member and provided with a pair of side prongs situated on either side of said other member, and extending downwards perpendicularly to the plane of the plate, each prong being provided with a recess having a forwardly-facing shaped edge; and
a control shaft mounted to rotate about its own axis inside the housing and having two cam-forming portions, each of which is suitable for co-operating with a shaped edge of the associated prong so as to cause the prongs to penetrate into and to be locked inside the housing on rotating the shaft, thereby interfitting the connection members.

In addition, according to a certain number of non-limiting additional characteristics of the invention:
the back edge of each of said prongs is rectilinear, the dimensioning and the positioning of the prongs being such that their outside faces are guided by the side walls of the housing, and their back edges are guided by the back wall of the housing;
the plate is dimensioned such that it serves as a lid for the housing when the device is in the connected state;
each of the cam-forming portions comprises a flat having a convex arcuate inlet edge;
the shaped edge of the recess has two forwardly-sloping portions;
the angle formed by the sloping portions is about 90°;
the bottom sloping portion is situated at a distance from the plate that is greater than the length of the connector member extending under the plate;
it includes abutments and/or indexing means for indexing the shaft in its end-of-rotation positions;
the connection member(s) carried by the plate is/are flanked by said side prongs, and is/are thereby protected from impact; and
the housing is provided with a lid urged by a spring in the closing direction, and provided with a lip sloping upwards like the peak of a cap for facilitating opening of the lid.

Other characteristics and advantages of the invention appear from the following description and from the accompanying drawings which show a possible embodiment of the invention merely by way of example, and in which:

FIG. 1 is an overall perspective view of the device;
FIG. 2 is a side view of the FIG. 1 device shown partly in section on a transverse vertical plane; and
FIGS. 3 to 5 are diagrammatic side views illustrating how the connection operates.

The device shown in the figures comprises two distinct connections, each of which is made up of a pair of complementary connector members, namely a male member and a female member, suitable for being interfitted axially in fluid-tight manner.

These elements are known per se.

Naturally, they are sealed off (fluid-tight). But when the male member is inserted into the female member, the connection is established and the hydraulic liquid can pass from one member to the other.

Reference 3 is used to designate the male members, and reference 4 is used to designate the female members.

The device is generally symmetrical in shape about a transverse vertical midplane referenced T in FIG. 1.

The members 3 are carried by a support 1 comprising a substantially rectangular plate 11.

The members 3 pass through the plate 11 perpendicularly thereto, their axes therefore extending vertically when the plate 11 is horizontal. The two members 3 are situated side-by-side, their axes lying in the same longitudinal vertical plane P (orthogonal to T).

Above the plate 11, the members 3 are connected to respective hoses 30 through which a hydraulic fluid can flow.

The plate 11 is provided with a pair of identical side prongs 10 situated on either side of the members 3 and extending downwards, perpendicularly to the plane of the plate 11, and parallel to the plane T.

One of the prongs is designated 10a and the other prong is designated 10b. Each prong is provided with a recess 101 having a shaped forwardly-facing edge.

The back edge 100 of each of the prongs is rectilinear and perpendicular to the plane of the plate.

The female members 4 are mounted inside a support housing 2. The housing is in the form of an upwardly open rectangular case whose side walls are referenced 22, the back wall being referenced 20, and the front wall 21.

The back wall 20 is extended by tabs 23 through which holes 230 are provided serving to receive suitable fixing means, e.g. bolts. Thus, the housing 2 may, for example, be fixed to a tractor, while the support 1 is carried by a hydraulically driven loader.

The two female members 4 pass through the bottom of the housing, which bottom is designated by reference 24 in FIG. 2. The axes of the female members are perpendicular to the plane of the bottom 24. The female elements 4 are situated side-by-side in the same longitudinal plane of the housing and they are spaced apart by a distance identical to the distance between the male elements.

Beyond the bottom of the housing, the female elements are connected to hoses 40 represented by dashed lines and similar to the above-mentioned hoses 30.

The device includes a shaft 5 of axis XX' extending longitudinally and parallel to the plane P and to the bottom 24, the shaft being guided in rotation via its end portions in the side walls 22.

The shaft 5 is disposed immediately in front of the members 4.

Suitable means are provided to prevent it from moving axially.

The members 4 are mounted in the bottom of the housing 24 with a small amount of clearance serving to enable them to be axially aligned with the male members 3 on connection.

Each member 4 has a hexagonal top portion 41, one of whose vertical faces (front face) is positioned parallel to XX', in the immediate vicinity of the back generator line of the shaft 5, and comes into abutment thereagainst if the member 4 is urged to rotate (in particular on installing or removing the hose 40) so as to prevent said member from rotating.

One end of the shaft 5 passes out through one of the sides of the housing, the external portion of the shaft being provided with an operating lever 6.

Inside the housing, the shaft 5 has two notched side portions 50a, 50b which constitute shaped surfaces forming cams whose purpose is explained below. The spacing between them corresponds to the spacing between the prongs 10a, 10b.

The shaft 5 can be rotated through an angle of 180° between an unlocking position, shown in FIG. 1 (lever 6 pointing downwards) and a locking position (lever 6 pointing upwards).

The outside face of the housing wall 22 situated in the vicinity of the lever 6 carries a circularly arcuate rib 7 which extends around the end portion of the shaft 5.

The top end face 70 and the bottom end face 71 of the rib serve as abutments for the lever 6 respectively in the locking position and in the unlocking position.

The device further includes means for indexing the shaft 5 in each of its two extreme positions. The means 9 include a cylinder 91 fixed to the bottom 24 of the housing facing the axis XX', in the central region of the shaft 5.

A small piston is slidably mounted in the cylinder 91. The piston is urged upwards by a spring 90 and it carries a hemispherical projection 92 suitable for engaging in a small indentation 51a or 51b formed in the shaft 5. The two indentations are diametrically opposite each other.

The purpose of the indexing means 9 is to hold the shaft securely, either in the unlocking position, thereby enabling the device 1 to be installed in the housing without the operator having to use one hand to hold the shaft in the correct position, or in the locking position, thereby preventing any unwanted unlocking that might be caused by vibration.

The housing 2 is provided with a hinged lid 8; a spring 80 constantly urges the lid to reclose automatically.

Thus, when the device 1 is removed, the housing is closed, and the female connectors 4 are protected from dust and any other dirt.

The front edge of the lid 8 forms a lip 81 sloping upwards like the peak of a cap and projecting beyond the front of the housing when the lid is closed. The purpose of this lip is explained below.

The prongs 10a and 10b are dimensioned and positioned such that on being engaged vertically downwards into the open housing 2, the outer side faces of the prongs slide against the inside faces of the side walls 22 of the housing, while their back edges 100 slide against the inside face of the back wall 20 of said housing.

Each prong 10a, 10b faces a respective shaped notch 50a, 50b once the support 1 has been inserted into the housing 2.

Going from the bottom upwards, the front edge of each of the prongs 10 comprises a plurality of rectilinear portions, namely an inlet bevel 102, a vertical portion 103, a backwardly-sloping portion 104, a vertical portion 105, and a forwardly-sloping portion 106.

The portions 104 and 106 form an angle of about 45° to the vertical.

They co-operate with the vertical edge 105 to define a recess in the form of a V having a truncated bottom, of angle equal to 90°, and whose opening faces forwards.

The locking takes place in this recess 101 by means of the cam 50 associated with the shaft 5.

As shown in FIGS. 2 to 5, each of the cam-forming shaped portions 50 comprises a flat 500 connected to a convex arcuate inlet portion 501 which runs smoothly into the semi-cylindrical remaining portion of the wall of the shaft 5.

In the initial disconnected position, shown in FIGS. 2 and 3, the flat 500 is disposed vertically, the arcuate portion 501 facing upwards.

The projection 92 on the piston (not shown in FIG. 3) is engaged in the indentation 51b, so that the shaft 5 is held in the desired position.

It should be noted that the operator generally does not have a free hand because one hand is being used to grasp the hoses 30, and the other hand is being used to grasp and manipulate the portion 1. It is therefore impossible for the operator to operate the lever 6 to act on the control shaft 5.

Neither is it possible for the operator to open the lid 8 by hand. However, the lid can be opened simply by means of the peak-forming lip 81. At the start of the operation, the operator places the device 1 in front of the housing 2 such that the back edge of the plate 11 is applied against the lip. By moving the device upwards and backwards, the operator can thus cause the lid to pivot in the opening direction.

In a single continuous movement, it is then possible for the operator to bring the portion 1 downwards into place inside the portion 2, the shaft 5 and its flats 500 being positioned and dimensioned such that the portions 103 of the prongs 10 can pass freely behind the flats at a short distance therefrom (see FIG. 3).

The engagement is continued until the ends 31 of the male members come into abutment in the receiving openings 41 of the female members 4.

By means of the operating lever 6, the operator then rotates the shaft 5 about its own axis XX' in the direction indicated by arrow V in FIG. 4.

Each cam portion 501 then acts against the associated sloping surface 104 to exert downward traction on the prongs 10; the desired penetration of the male member into the female member is thus obtained.

Since the prongs 10 are guided by the side faces and by the back face of the housing 2, the members 3 move downwards in an entirely rectilinear movement in alignment with the members 4 and with no risk of jamming.

At the end of the operation, as shown in FIG. 5, the cylindrical portion of the shaft 5 is situated inside the recess 101, thereby locking the coupling.

To uncouple the resulting assembly, it is necessary merely to rotate the shaft 5 in the opposite direction through an angle of 180°.

It should be noted that the male members 3 extend axially under the plate 11 over a length significantly shorter than the length of the prongs 10a, 10b. In addition, said members are flanked by said prongs. They are therefore protected from impacts, shocks, and other physical attack, even if the portion 1 is accidentally dropped on the ground, as is often the case in practice. This protection is advantageous because the connector members are relatively fragile and sensitive to impacts.

In FIG. 2, reference L designates the distance between the plate 11 and the bottom zone of the portion 104; reference l designates the length of the member 3 that extends under the plate.

According to an important characteristic of the invention, the dimension L is greater than l.

The advantage of this configuration can be understood by looking at FIG. 4.

On engaging the male portions into the female portions, the traction zone of the cams on the portions 104 is situated lower than the mutual abutment zone of the members 3 and 4, this difference being designated by e in FIG. 4.

Because the portion 104 slopes at 45° to the vertical, the force that is applied to said portion tends to tip the prongs backwards.

However, because the back edges 100 of the prongs are in contact with the back wall 20 of the housing, a reaction force F develops at that level and opposes such tipping.

The engagement is thus achieved smoothly and correctly, without the portion 1 wedging in the portion 2. The force required to achieve the coupling is relatively small, and wear is low.

In the connected position, the plate 11 acts as a lid for the housing, all of the members being properly protected from the outside environment.

Preferably, an extra-thick portion 12 in the form of a shoulder slab is provided under the plate 11 in its front zone so as to fit quite snugly inside the front edge of the housing when the assembly is locked, so as to improve said protection still further.

The back edge of the shoulder slab 12 may also be applied against a face (front face) of the hexagonal portion 31 of each of the male members 3 so as to prevent them from rotating.

Although in the above-described embodiment, the device includes two connectors, the invention naturally also applies to devices having only connector, or to devices having more than two.

In addition, the male members may be secured to the housing, and the female members may be secured to the plate.

I claim:

1. A hydraulic connection device for hydraulically connecting together at least one pair of male and female complementary connection members (3,4) suitable for being interfitted axially, said device comprising:

an upwardly open rectangular housing (2) whose bottom (24) carries one (4) of said members;

a plate (11) carrying the other member (3) and provided with a pair of side prongs (10) situated on either side of said other member (3), and extending downwards perpendicularly to the plane of the plate, each prong (10) being provided with a recess (101) having the form of a V with a truncated bottom, said recess (101) having a forwardly-facing shaped edge (104-105-106) including a backwardly sloping portion (104), a vertical portion (105) and a forwardly sloping portion (106); and a cylindrical control shaft (5) mounted to rotate about its own axis (XX') inside the housing (2) and having two cam-forming portions (50), each of which includes a flat (500) having a convex arcuate inlet edge (501), suitable for co-operating with the shaped edge (104-105-106) of the associated prong (10) so as to cause the prongs (10) to penetrate into and to be locked inside the housing (2).

2. A device according to claim 1, characterized by the fact that the back edge (100) of each of said prongs (10) is rectilinear, the dimensioning and the positioning of the prongs (10) being such that their outside faces are guided by the side walls (22) of the housing (2), and their back edges (100) are guided by the back wall (20) of the housing.

3. A device according to claim 2, characterized by the fact that the plate (11) is dimensioned such that it serves as a lid for the housing (2) when the device is in the connected state.

4. A device according to claim 1, characterized by the fact that the angle formed by the sloping portions (104, 106) is about 90°.

5. A device according to claim 1, characterized by the fact that the bottom sloping portion (104) is situated at a distance (L) from the plate (11) that is greater than the length (l) of the connector member (3) extending under the plate.

6. A device according to claim 1, characterized by the fact that it includes abutments (70) and/or indexing means (9, 51a, 51b) for indexing the shaft in its end-of-rotation positions.

7. A device according to claims 1, characterized by the fact that the connection member(s) (3) carried by the plate is/are flanked by said side prongs (10), and is/are thereby protected from impact.

8. A device according to claims 1, characterized by the fact that the housing (2) is provided with a lid (8) urged by a spring (80) in the closing direction, and provided with a lip (81) sloping upwards like the peak of a cap for facilitating opening of the lid.

* * * * *

UNITED STATES PATENT AND TRADEMARK OFFICE
CERTIFICATE OF CORRECTION

PATENT NO.  : 5,984,371
DATED  : November 16, 1999
INVENTOR(S)  : Mailleux It is certified that error appears in the above-identified patent and that said Letters Patent is hereby corrected as shown below:

Title page,
item [73], Assignee : delete "Souete d'etude et d'Innovation Dans le Materiel Agricole" and insert -- Societe d'Etude et d'Innovation dans le Materiel Agricole --.

In claim 1, column 6, line 16, delete "housing (2)." and insert -- housing (2) upon rotation of the cylindrical control shaft. --.

In claim 4, column 6, line 27, delete "the angle formed by the sloping portions" and insert -- the angle formed between the sloping portions --.

Signed and Sealed this

Fifth Day of December, 2000

Attest:

Q. TODD DICKINSON

*Attesting Officer*  *Director of Patents and Trademarks*